United States Patent
Verma et al.

(10) Patent No.: US 12,216,978 B2
(45) Date of Patent: Feb. 4, 2025

(54) ROUTING STRUCTURE OF SEMICONDUCTOR DEVICE AND FORMING METHOD THEREOF

(71) Applicant: TAIWAN SEMICONDUCTOR MANUFACTURING COMPANY LTD., Hsinchu (TW)

(72) Inventors: Anurag Verma, Hsinchu (TW);
Meng-Kai Hsu, Hsinchu County (TW);
Chih-Wei Chang, Hsinchu (TW);
Sang-Chi Huang, Hsinchu (TW);
Wei-Ling Chang, Hsinchu (TW);
Hui-Zhong Zhuang, Kaohsiung (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 301 days.

(21) Appl. No.: 17/225,903

(22) Filed: Apr. 8, 2021

(65) Prior Publication Data

US 2022/0327277 A1    Oct. 13, 2022

(51) Int. Cl.
| | |
|---|---|
| G06F 30/3953 | (2020.01) |
| G06F 30/392 | (2020.01) |
| G06F 30/394 | (2020.01) |
| G06F 30/398 | (2020.01) |
| H01L 23/522 | (2006.01) |
| H01L 23/528 | (2006.01) |
| H01L 27/088 | (2006.01) |
| H01L 29/06 | (2006.01) |
| H01L 29/40 | (2006.01) |
| H01L 29/417 | (2006.01) |
| H01L 29/423 | (2006.01) |
| H01L 29/66 | (2006.01) |
| H01L 29/786 | (2006.01) |

(52) U.S. Cl.
CPC ........ *G06F 30/3953* (2020.01); *G06F 30/392* (2020.01); *G06F 30/394* (2020.01); *G06F 30/398* (2020.01); *H01L 23/5226* (2013.01); *H01L 23/5286* (2013.01); *H01L 27/088* (2013.01); *H01L 29/0665* (2013.01); *H01L 29/401* (2013.01); *H01L 29/41733* (2013.01); *H01L 29/41775* (2013.01); *H01L 29/42392* (2013.01); *H01L 29/66742* (2013.01); *H01L 29/78618* (2013.01)

(58) Field of Classification Search
CPC .................................... G06F 30/3953
USPC ....................................... 716/130
See application file for complete search history.

(56) References Cited

U.S. PATENT DOCUMENTS

| | | | |
|---|---|---|---|
| 10,192,018 B1 * | 1/2019 | Gerousis | G06F 30/392 |
| 2019/0095573 A1 * | 3/2019 | Huang | G06F 30/394 |

* cited by examiner

*Primary Examiner* — Eric D Lee
(74) *Attorney, Agent, or Firm* — WPAT LAW; Anthony King

(57) ABSTRACT

A layout method and a semiconductor device are disclosed. The layout method includes: generating a design layout by placing a cell, wherein the cell includes: a first conductive segment overlapping a source/drain region and disposed immediately adjacent to a first power rail, wherein the first conductive segment has a length substantially equal to a cell length; a second conductive segment; and a third conductive segment between the first and second conductive segments. The layout method further includes: providing a fourth conductive segment and a fifth conductive segment to the design layout, wherein the fourth and fifth conductive segments are aligned in a first direction.

20 Claims, 8 Drawing Sheets

ROUTING STRUCTURE OF SEMICONDUCTOR DEVICE AND FORMING METHOD THEREOF

BACKGROUND

Electronic equipment involving semiconductor devices is essential for many modern applications. Technological advances in materials and design have produced generations of semiconductor devices, in which each generation includes smaller and more complex circuits than the previous generation. In the course of advancement and innovation, functional density (i.e., the number of interconnected devices per chip area) has generally increased while geometric size (i.e., the smallest component that can be created using a fabrication process) has decreased. Such advances have increased the complexity of processing and manufacturing semiconductor devices. The manufacturing of a semiconductor device becomes more complicated in a miniaturized scale, and the increase in complexity of manufacturing may cause deficiencies such as high yield loss, reduced reliability of electrical interconnection and low testing coverage. Therefore, there is a continuous need to modify the structure and manufacturing method of the devices in electronic equipment in order to decreasing device size while reducing manufacturing cost and processing time.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION

Figure 1A:
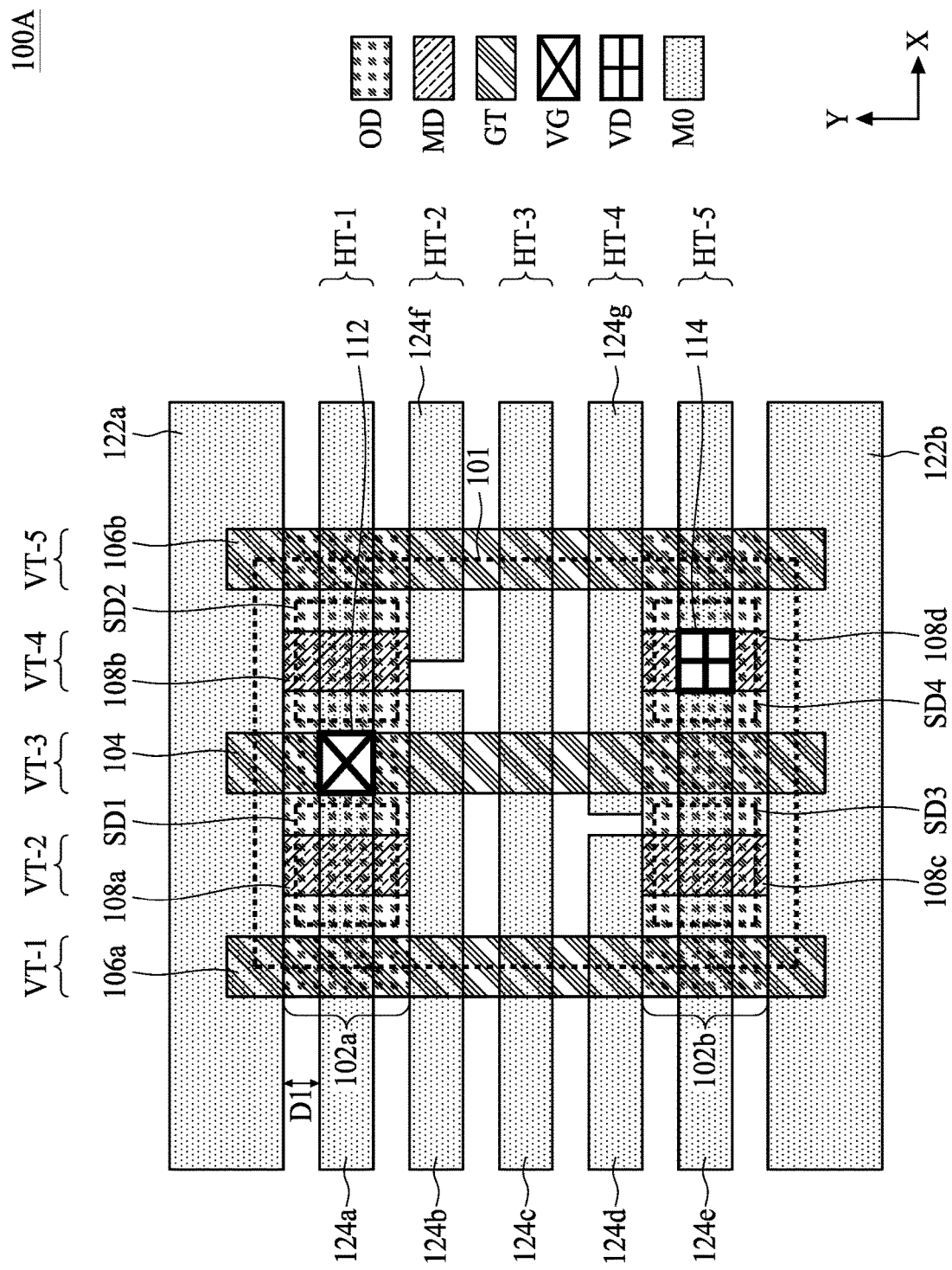
FIGS. 1A to 1C are design layouts of cells, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

The term "standard cell" or "cell" used throughout the present disclosure refers to a group of circuit patterns in a design layout to implement specific functionalities of a circuit. A standard cell is comprised of various patterns in one or more layers and may be expressed as unions of polygons. A design layout may be initially constructed by an array of identical or different standard cells during the layout design stage. The geometries of the patterns in the cells may be adjusted at different stages of layout design in order to compensate for design and process effects. A standard cell may cover circuits corresponding to a portion or an entirety of a die to be manufactured. The standard cells may be accessible from cell libraries provided by semiconductor circuit manufacturers or designers. Throughout the present disclosure, the standard cells are designed for implementing electronic circuits formed by semiconductor devices, e.g., a metal-oxide-semiconductor (MOS) device, and can be a planar field-effect transistor (FET) device, a fin-type FET (FinFET) device, a gate-all-around (GAA) device, a nanowire device, a fully-depleted silicon-on-isolator (FDSOI) device, or the like. In some embodiments, the standard cells include an interconnected structure of metal lines and metal vias arranged over a transistor, in which the metal lines and metal vias are interconnected to convey power and signals for the underlying transistor. In some embodiments, the standard cells are included in a standard cell library, which may be stored in a non-transitory computer-readable storage medium and accessed by a processor in a layout operation.

Figure 2A:
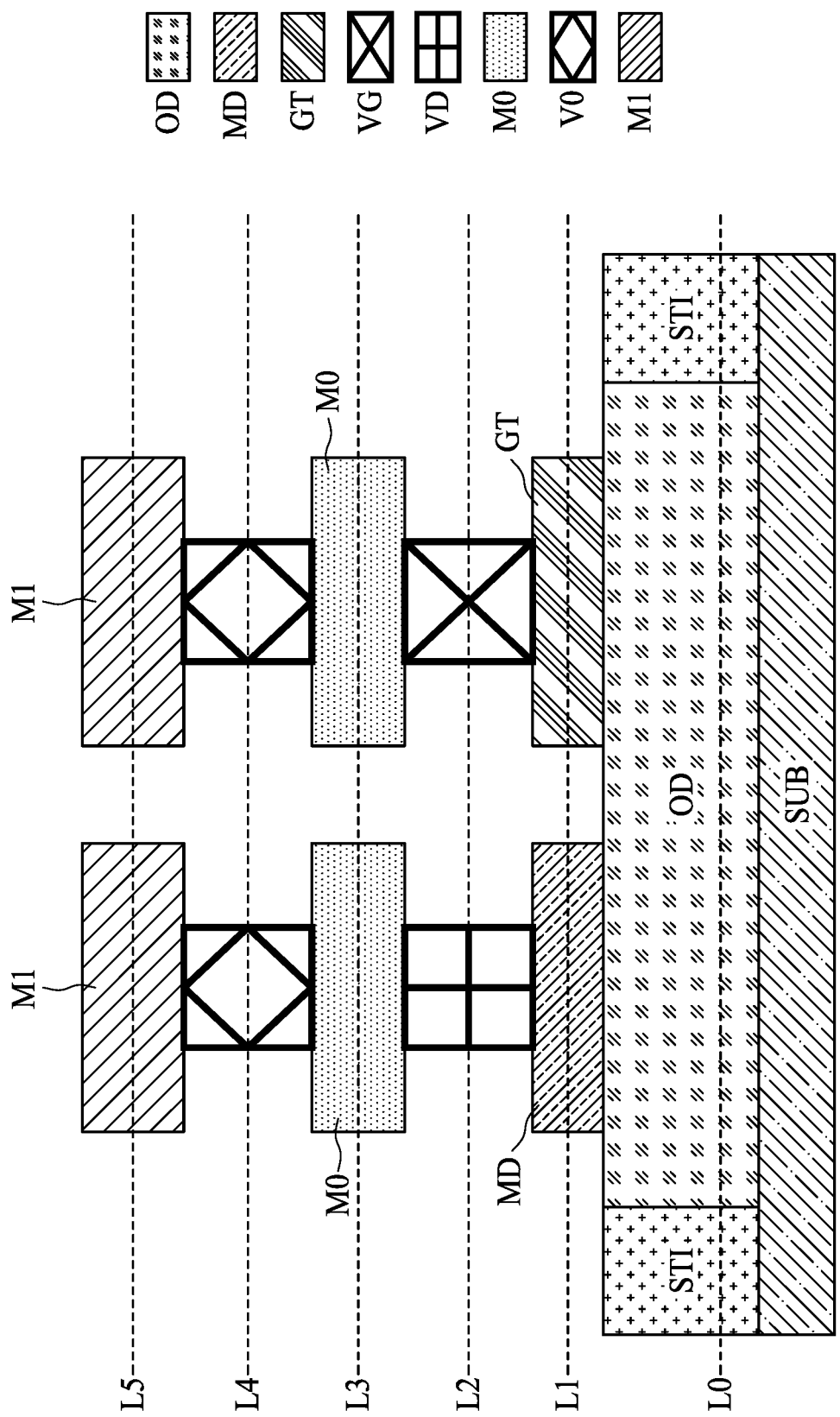
FIG. 2A is a cross-sectional view showing a vertical layer arrangement of a semiconductor device, in accordance with some embodiments of the present disclosure.

FIG. 1A is a design layout of a cell 100A, in accordance with some embodiments of the present disclosure. Referring to FIG. 1A, multiple layers are illustrated and overlaid one another along with various patterns in the respective layers from a top-view perspective. The cell 100A includes four source/drain regions (OD) SD1, SD2, SD3 and SD4 in a substrate layer L0, a gate electrode (GT) 104, cell-edge gate electrodes (GT) 106a and 106b, and gate-layer conductive lines (MD) 108 in the gate layer L1, conductive vias (VG) 112 and (VD) 114 in a conductive via layer L2, and power rails (M0) 122 and conductive segments (M0) 124 in a conductive line layer L3. The abovementioned features are overlaid with each other from a top-view perspective as shown in FIG. 1A. FIG. 2A is a cross-sectional view showing a vertical arrangement of the patterns in the abovementioned layers of the cell 100A, in accordance with some embodiments of the present disclosure.

Referring to FIG. 2A, the substrate layer L0 is formed or provided, the substrate layer L0 includes a substrate SUB, which may be formed of a silicon substrate or other suitable semiconductor substrate. An active region OD is arranged in the substrate layer L0 and exposed through an upper surface of the substrate layer L0. Although not separately shown, the active region OD may include a first source/drain region, a second source/drain region and a channel region of a transistor (not shown) interposed between the two source/drain regions. The source/drain regions in the active region OD may be an N-type active region doped with N-type impurities such as arsenic, phosphorus, or the like, or a P-type active region doped with P-type impurities such as boron or the like. The channel region in the active region OD may be undoped or lightly doped. In some embodiments where a raised active region, a FinFFT device or a GAAFET device is involved, the active region OD may have an upper surface higher than the upper surface of the substrate layer L0 and extends into the gate layer L1 over the substrate layer L0. In some embodiments, the substrate layer L0 further includes isolation structures STI defining and laterally surrounding the active region OD. In some embodiments, the isolation structures STI are formed of dielectric materials, such as oxide or nitride, and may be referred to as shallow trench isolation.

The gate electrode GT is provided in the gate layer L1 over the active region OD. The gate electrode GT may be formed of a conductive material, such as doped polysilicon or formed of a metal gate comprising metallic materials such as tungsten, and cobalt, and other work function adjusting metals, such as Ti, Al, TiAl, TiN, TaC, and the like. The gate electrode GT includes the gate electrode 104 and the cell-edge gate electrodes 106a and 106b shown in FIG. 1A. The cell-edge gate electrodes 106a and 106b may be formed of a conductive material substantially same as the gate electrode 104, however, the cell-edge gate electrodes 106a and 106b are not functioning in forming a transistor of the cell 100A. In some embodiments, the cell-edge gate electrodes 106a and 106b are provided for defining the cell boundary 101. Further, a gate-layer conductive line MD is also provided in the gate layer L1 over the active region OD adjacent to the gate electrode GT. Although not explicitly shown in FIG. 2A, a gate dielectric film formed of dielectric materials may be arranged between the channel region and the gate electrode GT. In some embodiments, the substrate layer L0 and the gate layer L1 may be referred to as a transistor layer.

A plurality of conductive line layers, e.g., layers L3 and L5, and a plurality of conductive via layers, e.g., layers L2 and L4, are provided over the gate layer L1. Each of the conductive line layers includes a plurality of parallel conductive segments, e.g., conductive segments M0 and M1, and each of the conductive via layers includes at least one conductive via, e.g., conductive vias VG, VD and V0. These conductive segments (including the gate-layer conductive line MD) and the conductive vias may be formed of conductive materials, such as copper, tungsten, aluminum, titanium, tantalum, alloys thereof, or the like. The conductive line layers are electrically interconnected through the intervening conductive via layers. For example, the conductive line layers L3 and L5 are arranged over one another and interconnected through the conductive via layer L4, respectively. The conductive line layer L3 is further electrically connected to the gate layer L1 through the conductive via layer L2 therebetween, in which a conductive segment M0 in the conductive line layer L3 is electrically connected to the gate electrode GT through a gate via VG and another conductive segment M0 is electrically connected to the gate-layer conductive line MD through a drain via VD. The numbers and materials of the conductive lines and conductive vias shown in FIGS. 1A and 2A are for illustrative purposes only. Other numbers of layers, materials, and configurations of the semiconductor device is within the contemplated scope of the present disclosure.

Referring to FIG. 1A, the active regions (OD) 102a and 102b are arranged in the substrate layer L0. The active regions 102a and 102b may extend in the row direction along the x-axis. In some embodiments, the active regions 102a and 102b are a P-type active region and an N-type active region, respectively. However, in other embodiments, the active regions 102a and 102b are an N-type active region and a P-type active region, respectively. The active regions 102a and 102b are defined and separated from each other by the isolation structures STI.

The gate electrode (GT) 104 is disposed in the gate layer L1 over the active regions 102a and 102b. The gate electrode 104 extends in the column direction along the y-axis perpendicular to the x-axis. In some embodiments, the gate electrode 104 serves as a functional gate electrode in forming a transistor, such as a FET device.

Two cell-edge gate electrodes (GT) 106, i.e., 106a and 106b, are disposed in the gate layer L1 and extend in the column direction on a left cell side and a right cell side of the cell boundary 101, respectively, of the cell 100A. The cell-edge gate electrodes 106 are parallel to the gate electrode 104. In some embodiments, the cell-edge gate electrodes 106 are not functioning in forming a transistor of the cell 100A.

Source/drain regions SD1 and SD2 are defined in the active region 102a and delimited by the gate electrode 104 and the cell-edge gate electrodes 106, in which the source/drain regions SD1 and SD2 correspond to a source terminal and a drain terminal, respectively, of a first transistor. The active region 102a covered by the gate electrode 104 between the source/drain regions SD1 and SD2 is defined as the channel region of a transistor. Similarly, Source/drain regions SD3 and SD4 are defined in the active region 102b and delimited by the gate electrode 104 and the cell-edge gate electrodes 106, in which the source/drain regions SD3 and SD4 correspond to a source terminal and a drain terminal, respectively, of a second transistor. The active region 102b covered by the gate electrode 104 between the source/drain regions SD3 and SD4 is defined as the channel region of the second transistor.

Referring to FIGS. 1A and 2A, in some embodiments, the conductive segments in the conductive line layer L3, L5 or above, such as the conductive segments M0 and M1 are allocated into tracks for the cell 100A, throughout the present disclosure, the term "track" is defined as predetermined regions of the cell 100A from a top-view perspective in which conductive segments or power rails are allocated within the cell 100A. In some embodiments, the track is in a strip or line shape. The number of parallel tracks and the track pitch may be predetermined in order to fulfill design rules.

The tracks may be further classified into vertical tracks VT and horizontal tracks HT, in which each vertical track VT extends in the column direction and each horizontal track HT extends in the row direction. For example, a vertical track VT-1 is defined as a strip overlapping the cell-edge gate electrode 106a from a top-view perspective, and a horizontal track HT-1 is defined as a strip overlapping the active region 102a from a top-view perspective. In some embodiments, the source/drain regions SD1 and SD3 overlap the vertical track VT-2 and the source; drain regions SD2 and SD4 overlap the vertical track VT-4. As shown in FIG. 1A for the depicted embodiment, the number of vertical tracks VT is five and the number of horizontal tracks HT is five, but the present disclosure is not limited thereto. The number of vertical tracks VT and the number of horizontal tracks HT may be varied according to different implementations. The number of vertical tracks VT may be the same or different from the number of horizontal tracks HT.

The gate-layer conductive lines (MD) 108 are arranged in the gate layer L1. The gate-layer conductive lines 108 may be arranged parallel to the gate electrodes 104 in the respective vertical tracks VT. For example, gate-layer conductive lines 108a and 108c are arranged in the vertical track VT-2 and gate-layer conductive lines 108b and 108d are arranged in the vertical track VT-4. The gate-layer conductive lines 108 arranged in the same track, e.g., the gate-layer conductive lines 108a and 108c in the vertical track VT-2 may be aligned in the column direction. The gate-layer conductive lines 108b and 108d may be aligned in the vertical track VT-4 in the column direction. Referring to FIG. 1A and FIG. 2A, the gate-layer conductive line 108a crosses and is electrically connected to the source/drain region SD1, and the gate-layer conductive line 108b crosses and is electrically connected to the source/drain region SD2. The gate-layer conductive line 108c crosses and is electrically connected to the source/drain region SD3, and the gate-layer conductive line 108d crosses and is electrically connected to the source/drain region SD4.

The power rails (M0) 122 and the conductive segments (M0) 124 are arranged in the conductive line layer L3 and extend in the row direction. The power rails 122 (e.g., power rails 122a and 122b) and the conductive segments 124 (e.g., conductive segments 124a, 124b, 124c, 124d, 124e, 124f and 124g) are arranged in parallel. The power rails 122a and 122b are on opposite sides of the cell 100A. For example, the power rails 122a and 122b are arranged on an upper cell side and a lower cell side, respectively, of the cell 100A. In some embodiments, the power rails 122a and 122b are configured to supply a first voltage VDD and a second voltage VSS, respectively. In some embodiments, the first voltage VDD is a positive voltage and the second voltage VSS is ground.

The conductive segments 124 are arranged between the power rails 122a and 122b. The conductive segments 124 are arranged parallel to the power rails 122. In some embodiments, some of the conductive segments 124 are configured as input/output pins of the cell 100A while some other conductive segments 124 are configured as internal connection pins of the cell 100A. The internal connection pins are not functioning in providing input/output signals. In some embodiments, the internal connection pins only serve as connection nodes for electrically connecting features in different layers within the cell 100A. Each of the conductive segments 124 is arranged in and aligned with one of the horizontal tracks HT. For example, the conductive segment 124a is arranged in and aligned with the horizontal track HT-1.

In some embodiments, the lengths and number of the conductive segments 124 in one horizontal track HT can be varying. In some embodiments, one of the conductive segments 124 occupies an entire horizontal track HT, e.g., only one conductive segment 124a, 124c or 124e is disposed in the horizontal track HT-1, HT-3 or HT-5, respectively, within the cell 100A. In some embodiments, the conductive segment 124a, 124c or 124e is configured as an input/output pin of the cell 100A and the full length of the conductive segment 124a, 124c or 124e facilitates electrical connections to overlying conductive segments 142, 144 in the conductive line layer L5 (shown in FIG. 1B). In some embodiments, a full-length conductive segment which extends in the row direction has a length measured in the row direction substantially equal to or greater than a cell length, measure in the row direction, of the cell in which the conductive segment resides. Similarly, a full-length conductive segment which extends in the column direction has a length measured in the column direction substantially equal to or greater than a cell height, measured in the column direction, of the cell in which the conductive segment resides.

In some embodiments, two or more conductive segments 124 may be arranged in a single horizontal track HT and aligned with each other. For example, the conductive segments 124b and 124f are arranged in the horizontal track HT-2, and the conductive segments 124d and 124g are arranged in the horizontal track HT-4. In some embodiments, the conductive segments 124b and 124g are configured as the input/output pins of the cell 100A, while the conductive segments 124d and 124f are configured as internal connection pins of the cell 100A.

In some embodiments, the full-length conductive segment 124a or 124e is arranged immediately adjacent to the power rail of the cell 100A. For example, the conductive segment 124a is disposed immediately adjacent to the power rail 122a. The conductive segment 124a further overlaps the source/drain regions SD1 and SD2 from a top-view perspective. The conductive segment 124e is disposed immediately adjacent to the power rail 122b. The conductive segment 124e further overlaps the source/drain regions SD3 and SD4 from a top-view perspective. The conductive segments 124b, 124c, 124d, 124f and 124g are disposed between the full-length conductive segments 124a and 124e. The conductive segment 124a is closest to the power rail 122a compared to the conductive segments 124b, 124c, 124d, 124e, 124f or 124g. Further, the conductive segment 124e is closest to the power rail 122b compared to the conductive segments 124a, 124b, 124c, 124d, 124f or 124g. In some embodiments, a length of the conductive segment 124a is substantially equal to or greater than a length of any conductive segments 124 which are not immediately adjacent to the power rails 122. In some embodiments, a length of the conductive segment 124*a* is substantially equal to a length of the conductive segment 124*e*.

In some embodiments, a width of the power rails 122 in the column direction is substantially greater than a width of the conductive segments 124 in the column direction. In other embodiments, the power rails 122 and the conductive segments 124 have substantially equal widths in the column direction. In some embodiments, the conductive segments 124 are equally spaced between the power rails 122*a* and 122*b* in the column direction. Further, each of the power rails 122 is spaced from its adjacent conductive segment 124 by a distance D1 in the column direction. For example, the power rail 122*a* is spaced from the conductive segment 124*a* by the distance D1. In some embodiments, the power rail 122*b* is also spaced from the conductive segment 124*e* by the distance D1.

In some embodiments, the cell height of the cell 100A is defined as a pitch between the power rails 122*a* and 122*b* measured in the column direction and is determined according to a total number of the conductive segments 124 accommodated within the cell 100A. As shown in FIG. 1A for the depicted embodiment, the total number of conductive segments 124 is five.

The conductive vias 112 and 114 in the conductive via layer L2 electrically connect the gate layer L1 to the conductive line layer L3. The conductive via 112 is arranged as a gate via VG over the gate electrode 104 and electrically connects the gate electrode 104 to the conductive segment 124*a*, where the conductive segment 124*a* serves as an input pin or output pin of the cell 100A. The conductive via 114 is arranged as a drain via VD over the gate-layer conductive line 108*d* and electrically connects the gate-layer conductive line 108*d* to the conductive segment 124*e*, where the conductive segment 124*e* serves as an input pin or output pin of the cell 100A. In some embodiments, additional conductive vias may be arranged as power vias over the power rails 122*a* and 122*b*, respectively, and electrically connect the gate-layer conductive lines 108 to the power rails 222*a* and 222*b*.

Figure 1B:
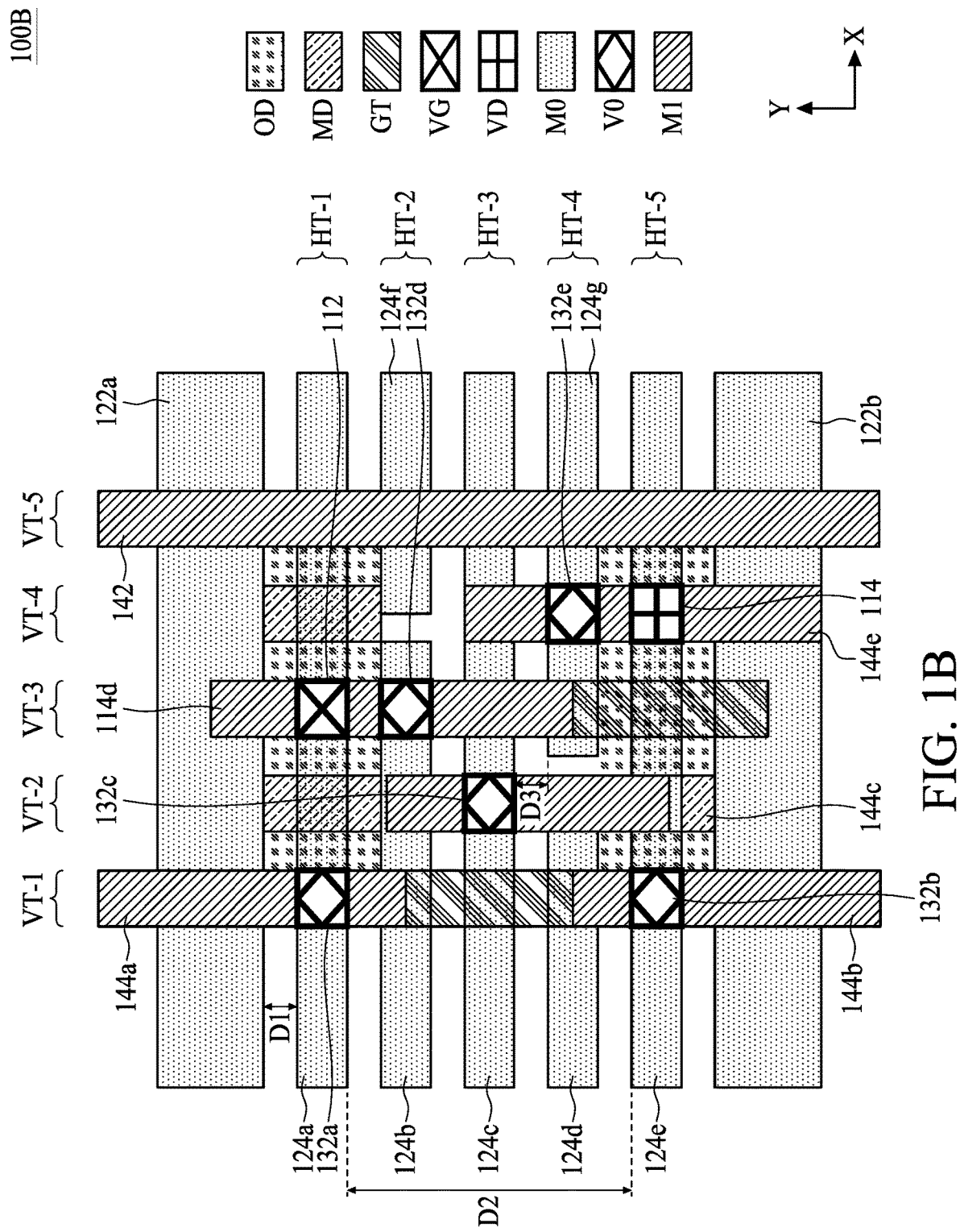

FIG. 1B is a design layout 100B, in accordance with some embodiments of the present disclosure. The design layout 100B includes the cell 100A, and therefore the descriptions of the cell 100A are omitted for brevity. One difference between the design layout 100B and the cell 100A is that the design layout 100B further includes conductive vias (V0) 132 in the conductive via layer L4, and a conductive segment (M1) 142 and conductive segments (M1) 144 in the conductive line layer L5. In some embodiments, the conductive segment 142 is configured as a power rail 142.

In some embodiments, the power rail (M1) 142 and the conductive segments (M1) 144 are arranged in the conductive line layer L5 and extend in the column direction. The power rail 142 and the conductive segments 144 (e.g., conductive segments 144*a*, 144*b*, 144*c*, 144*d* and 144*e*) are arranged in parallel. In some embodiments, the power rail 142 is arranged on a cell side of the cell 100A. As discussed previously, the power rail 142 is arranged in and aligned with one of the vertical tracks VT. For example, the power rail 142 is arranged in the vertical track VT-5. In some embodiments, the power rail 142 occupies an entire vertical track VT, such as the vertical track VT-5. In some embodiments, the power rail 142 is configured to supply the first voltage VDD or the second voltage VSS. In some embodiments, the power rail 142 is replaced with another conductive segment 144 for conveying signals.

In some embodiments, the conductive segments 144 are arranged adjacent to the power rail 142. In some embodiments, the conductive segments 144 are arranged parallel to the power rail 142. As discussed previously, each of the conductive segments 144 is arranged in and aligned with one of the vertical tracks VT. For example, the conductive segment 144*c* is arranged in the vertical track VT-2.

In some embodiments, the lengths and number of the conductive segments 144 in one vertical track VT can be varying. In some embodiments, one of the conductive segments 144 occupies an entire vertical track VT. In some embodiments, two or more conductive segments 144 may be arranged in a single vertical track VT and aligned with each other. For example, the conductive segment 142*a* and the conductive segment 142*b* are arranged in the vertical track VT-1. In some embodiments, the conductive segments 142*a* and 142*b* are aligned in the column direction.

One or more conductive vias (V1) 132 in the conductive via layer L4 electrically connect the conductive line layer L3 to the conductive line layer L5. For example, the conductive via 132*a* electrically connects the conductive segment 124*a* to the conductive segment 144*a*, in which the conductive segment 124*a* serves as an input pin or output pin of the cell 100A. The conductive via 132*b* electrically connects the conductive segment 124*e* to the conductive segment 144*b*, in which the conductive segment 124*e* serves as an input pin or output pin of the cell 100A. In some embodiments, the conductive vias 132*a* and 132*b* are aligned in the column direction.

In some embodiments as shown in FIG. 1B, additional conductive vias such as conductive vias 132*c*, 132*d* and 132*e* may electrically connect the conductive segment 124*c*, 124*b* and 124*g* to conductive segments 144*c*, 144*d* and 144*e*, respectively. In some embodiments, a distance D2 between the conductive vias 132*a* and 132*b* is greater than a distance between any other two of the conductive vias 132. For example, the distance D2 between the conductive vias 132*a* and 132*b* in the column direction is greater than distance D3 between the conductive vias 132*c* and 132*e* in the column direction.

Figure 1C:
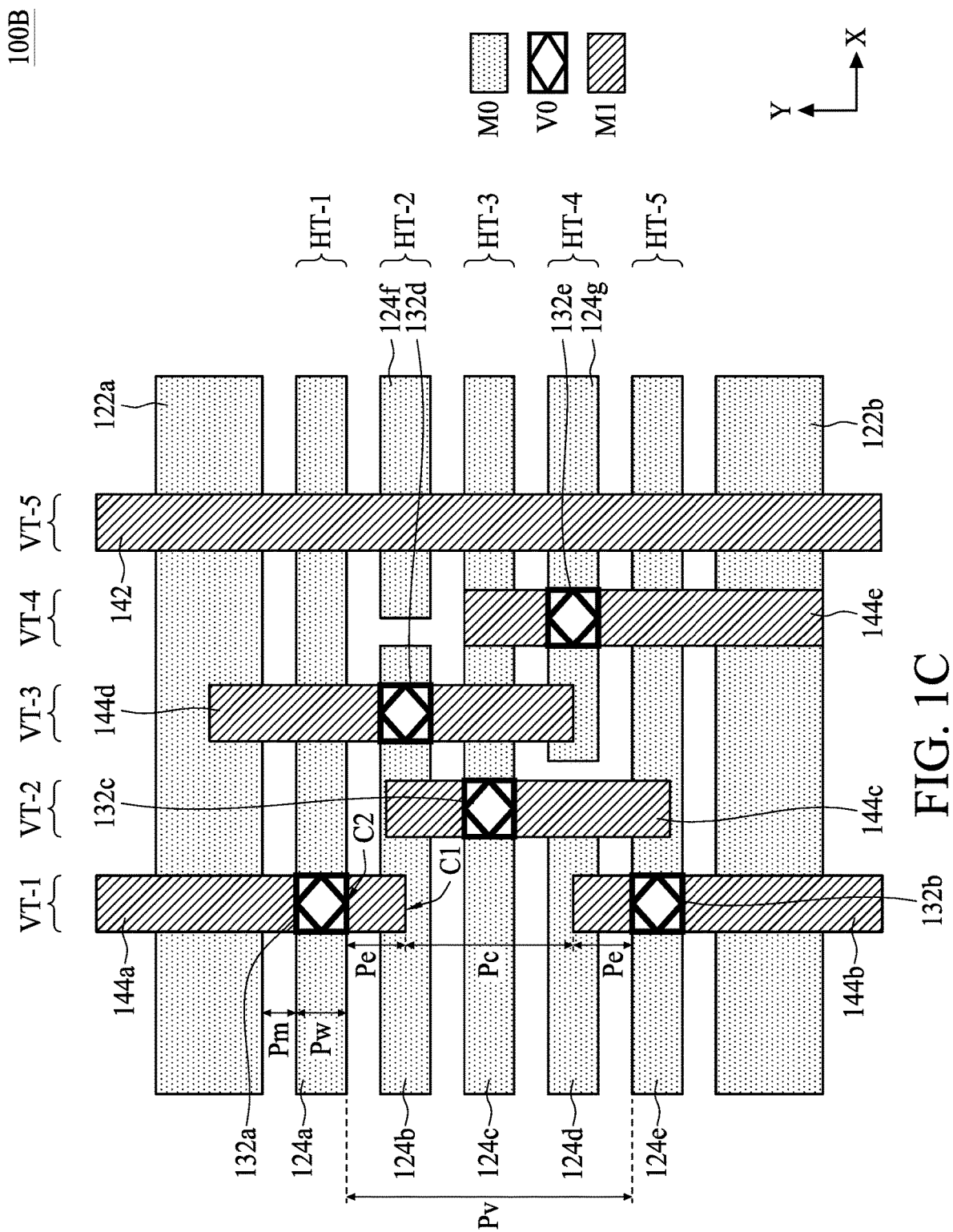

FIG. 1C is the design layout 100B, in accordance with some embodiments of the present disclosure. Referring to FIG. 1C, for the sake of clarity only part of the cell features are illustrated in FIG. 1C, e.g., the power rails 122 and the conductive segments 124 arranged in the conductive line layer L3, the conductive vias 132 in the conductive via layer L4, and the power rail 142 and the conductive segments 144 arranged in the conductive line layer L5.

As shown in FIG. 1C for the depicted embodiment, the number of conductive segments 124 is seven, but the number of conductive segments 124 configured as input/output pins of the cell 100A is five. The number of conductive segments 144 may be varied according to the number of the conductive segments 124 configured as input/output pins. In some embodiments, the number of conductive vias 132 may be varied according to the number of the conductive segments 144. As shown in FIG. 1C, the number of conductive vias 132 is five.

In some embodiments, the number of the conductive segments 144 is greater than or equal to the number of vertical tracks VT. In the present embodiment, the number of conductive segments 144 is five and the number of vertical tracks VT is also five, however, the number of available vertical tracks for the conductive segments 144 is four since the power rail 142 occupies the vertical track VT-5.

A distance Pv is defined as a spacing between adjacent conductive vias 132 measured in the column direction in a vertical track VT. For example, the conductive via 132a is spaced from the conductive via 132b by the distance Pv.

A distance Pc is defined as a spacing between adjacent conductive segments 144 measured in the column direction in a vertical track VT. For example, the conductive segment 144a is spaced from the conductive segment 144b by the distance Pc.

A distance Pm is defined as a spacing between the power rail 122 and the conductive segment 124 disposed immediately adjacent to the power rail 122, measured in the column direction. For example, the conductive segment 124a is spaced from the power rail 122a by the distance Pm. In some embodiments, the spacing between the conductive segments 124 is the distance Pm. In some embodiments, the distance Pm is defined as a spacing between two adjacent conductive segment 124 configured as input/output pins of the cell 100A.

A width Pw is defined as a width of each of the conductive segments 124. For example, the conductive segment 124a has a width Pw.

A length Pe is defined as a via enclosure length of the conductive segment 144 with respect to the conductive via 132 to which the conductive segment 144 is electrically coupled. The length Pe may be measured, in the column direction, from an end side of the conductive segment 144 to a side of the conductive via 132 closest to the end side of the conductive segment 144. For example, a distance between an end side C1 of the conductive segment 144a and a side C2 of the conductive via 132a is defined as the via enclosure length Pe. In some embodiments, the via enclosure length Pe is required to be substantially equal to or greater than a minimum via enclosure length to ensure that each conductive segment 144 overlaps the corresponding conductive via 132 with sufficient margins so as to avoid undesirable circuit opening between the conductive via 132 and the conductive segment 144 once fabricated.

As shown in FIG. 1C for the depicted embodiment, the distance Pv equals to a sum of the distance Pc and two times the length Pe. In other words, Pv=Pc+2Pe. In some embodiments, the distance Pv is greater than about 82 nanometers (nm). In some embodiments, the distance Pv is greater than about 110 nm. In some embodiments, the length Pe is greater than the distance Pm. In some embodiments, the length Pe is less than or equal to about 30 nm. In some embodiments, the length Pe is less than or equal to about 22 nm. In some embodiments, the width Pw is greater than the distance Pm.

As the demand for smaller and more complex semiconductor devices continues, the available spacing of the vertical tracks VT in the cell 100A for the placement of the conductive segments 144 in the conductive line layer L5 is reduced. For example, the power rail 142 is placed in the vertical track VT-5 according to a design rule. In some embodiments, the design rule is included in a design rule check (DRC) deck. Thus, only four vertical tracks VT are available for the conductive segments 144a, 144b, 144c, 144d and 144e, which serve as input pins or output pins of the cell 100A. That means the number of conductive segments 144 is greater than the number of available vertical tracks VT. In the depicted example, the number of conductive segments 144 is five, and the number of available vertical tracks VT is four. The conductive segments 144a, 144b, 144c, 144d and 144e should share the remaining vertical tracks VT-1, VT-2, VT-3 and VT-4. In such a case, at least two of the conductive segments 144 should be placed with a same vertical track VT.

In some situations, the available number of the vertical tracks VT for the conductive segments 144 in the conductive line layer L5 imposes difficulty to the manufacturing process of the semiconductor device in advanced technology nodes. The pitch between two parallel conductive segments 124 configured as input/output pins may not be sufficiently large to meet the design rules, and thus some defects such as shorting between adjacent conductive segments 144 may occur if the semiconductor device is otherwise fabricated given the limited pitch. The defects resulting from the manufacturing limitation can be reduced or mitigated through managing the locations of conductive segments 122 that electrically coupled to the respective conductive segments 144 in the same track in the cell 100A. That is, if two adjacent conductive segments 144 in the design layout 100B are to be formed in a same vertical track VT, a distance Pc between these two adjacent conductive segments 144 is greater than or equal to a predetermined value P1 required by the designed rule. In other words, Pc≥P1. The predetermined value P1 may be defined as a minimum allowable vertical spacing (also referred as minimal segment end spacing) between the conductive segments 144 in a same conductive line layer L5 in the same vertical track VT. Thus, during a design rule check (DRC) operation, the distance Pv should be greater than or equal to a sum of the predetermined value P1 and two times the length Pe according to the design rules for the adjacent conductive segments 144. In other words, Pv≥P1+2Pe.

Further, as the device size of the semiconductor device continues to reduce, the distance Pc between adjacent conductive segments 144 also made less progressively according to the reduced distance between the conductive segments 124, which may reach as small as about 38 nm or less. In some situations, such small distance Pc of the conductive segments 144 in the conductive line layer L5 imposes difficulty to the manufacturing process of the semiconductor device and some defects such as shorting between adjacent conductive segments 144 may occur. The defects resulting from the manufacturing limitation can be reduced or mitigated through managing the locations of adjacent conductive segments 144 in the design layout 100B. That is, if two adjacent conductive segments 144 in a design layout 100B are to be formed in a same vertical track VT, a distance Pc between the two adjacent conductive segments 144 should be greater than a predetermined value. The predetermined value may be defined as a minimum allowable vertical spacing (also referred as minimal segment end spacing) between the conductive segments 144 in a same conductive line layer L5 in a same vertical track VT.

Technological advances in materials and design may aid in improving flexibility and utilization of cell placement. According to a design rule in existing technology nodes, a gate via VG should not overlap an active region OD from a top-view perspective. Thus, conductive segments configured as input/output pins of the cell cannot be placed in the horizontal track HT-1 or the horizontal track HT-5 since both horizontal tracks HT-1 and HT-5 overlap the active region 102a or 102b from a top-view perspective. Accordingly, the input/output pins of the cell are usually placed around the center in a cell. For example, the input/output pins of the cell may only be placed in the horizontal tracks HT-2, HT-3 or HT-4. In other words, only three out of five horizontal tracks HT are available for input/output pins. As a result, the pitch between two input/output pins may not be sufficiently large to meet the design rules, and thus some defects such as shorting between adjacent conductive segments 144 may occur. Further, the closely placed input/output pins of the cell may force an automatic placement and routing (APR) tool to access the input/output pins from different tracks to avoid design rule violation, and may lead to the routing congestion issue. If more tracks are to be provided, the cell size needs to be increased, which may lead to area penalty.

The defects resulting from the manufacturing limitation may be mitigated or reduced since the design rule of the placement constraint of the gate via VG no longer applies to the transistors in advanced technology nodes. For example, and the transistor in advanced technology nodes includes a FinFET device, a GAA device, a GAAFET device, a nanowire device, or the like. The advances in the transistor structure may allow the gate via VG to overlap the active region OD from a top-view perspective without adverse effects. Thus, conductive segments 124 configured as input/output pins of the cell can be placed outwardly. For example, the input/output pins of the cell may be placed in the horizontal track HT-1 or the horizontal track HT-5. In other words, five out of five horizontal tracks HT are available for input/output pins. Thus, since more routing tracks are available and the pitch between adjacent input/output pins increases, it is possible that two conductive segments electrically coupled to the corresponding two input/output pins may be placed in a same vertical track VT.

In order to better comply with the design rule for the adjacent conductive segments 144 in the conductive line layer L5 during the DRC operation, the locations of the conductive segments 124 in the conductive line layer L3 are specifically designed. In some embodiments, at least one of the conductive segments 124 configured as input/output pins of the cell 100A is placed in the horizontal tracks HT immediately adjacent to the power rail 122. For example, the conductive segment 124a is placed in the horizontal track HT-1 immediately adjacent to the power rail 122a. In some embodiments, at least two of the conductive segments 124 configured as input/output pins of the cell 100A are placed in the horizontal tracks HT immediately adjacent to the power rail 122. For example, the conductive segment 124e configured as input/output pins of the cell 100A is placed in the horizontal track HT-5 immediately adjacent to the power rail 122b. The arrangement of the input/output pins (i.e., the conductive segments 124a and 124e) immediately adjacent to the power rail 122a may increase the pitch between the input/output pins and thus may improve the flexibility of cell routing.

In some embodiments, the conductive segment 124a is placed in the horizontal track HT-1 and the conductive segment 124e is placed in the horizontal track HT-5 farthest from the horizontal track HT-1, By placing the input/output pins (e.g., conductive segments 124a and 124e) in the horizontal tracks HT-1 and HT-5, which have the greatest distance than that between any other horizontal tracks HT, the layouts of the overlying conductive segments 144 in a same vertical track VT may be in compliance with the design rule. In some embodiments, only one of the conductive segments 124 configured as input/output pins of the cell 100A is placed in a horizontal track HT immediately adjacent to the power rail 122. Other conductive segments 124 configured as input/output pins of the cell 100A may be placed in any horizontal track HT between the power rails 122, as long as the distance between the adjacent conductive segments 144 in the conductive line layer L5 is sufficient and complies with the design rule.

In some embodiments, at least one of the conductive segments 124 configured as input/output pins of the cell 100A has a full-length substantially equal to or greater than a cell length. In some embodiments, the conductive segments 124 configured as input/output pins of the cell 100A having the full-length is placed immediately adjacent to the power rail 122. For example, the conductive segment 124a having the full-length is placed immediately adjacent to the power rail 122a. In some embodiments, at least two of the conductive segments 124 having the full-length are placed immediately adjacent to the power rail 122. For example, the conductive segment 124e having the full-length is also placed immediately adjacent to the power rail 122b. In some embodiments, the full-length conductive segments 124a and 124e configured as input/output pins of the cell 100A are disposed closest to the power rails 122a and 122b, respectively. The arrangement of the full-length conductive segments 124a and 124e immediately adjacent to the power rail 122a may aid in improving the flexibility of routing and utilization of cell placement.

In some embodiments, the conductive segments 124 configured as input/output pins of the cell 100A are made as long as possible to provide APR tool with greater routing flexibility for input/output pin access. In some embodiments, if the conductive segments 124 configured as input/output pins of the cell 100A have different lengths, the conductive segments 124 with a greater length are located nearer to the cell boundary 101 and the conductive segments 124 with a less length are located furtherer from the cell boundary 101 such that the likelihood of the pin access near the cell boundary can be reduced. The possibility of adversely affecting the neighboring cells due to the cell-boundary access pins can be relieved.

In some embodiments, since the conductive segments 124a and 124e are configured as an input pin or output pin of the cell 100A, the conductive segments 144 in the conductive line layer L5 are provided to be electrically connected to the underlying conductive segments 124a and 124e to external circuits or features. If the conductive segment 124a is placed in the horizontal track HT-2 instead of the horizontal track HT-1, and the conductive segment 124e is placed in the horizontal track HT-4 instead of the horizontal track HT-5, the distance Pc between the conductive segments 144a and 144b would be inevitably reduced due to the arrangement of the conductive segments 124a and 124e in the conductive line layer L3. The reduced distance Pc may be smaller than the minimal segment end spacing, and thus violates the design rule for the adjacent conductive segments 144.

Accordingly, the present disclosure provides a structure of a cell with specifically designed locations of the conductive segments 124 in the conductive line layer L3. In some embodiments, the arrangement of the conductive segments 124 may aid in improving the density of input/output pins of the cell 100A. In some embodiments, the density of input/output pins of the cell 100A is considered as uniform. In some embodiments, the arrangement of the conductive segments 124 allows the overlying conductive segments being placed in a single track for multiple input/output pin access. In some embodiments, the arrangement of the conductive segments 124 provides benefits in high density design where the routing resources in the lower layers become critical and a higher chance of design rule violations may result. In some embodiments, the advantage of the rearrangement of the conductive segments 124 is more pronounced when one or more track is pre-occupied for other purposes, e.g., used as a power rail. The proposed cell structure and routing framework show significant improvements of input/output pin density and device size.

In some embodiments, according to a design rule for the adjacent conductive segments 144 during a DRC operation, if two adjacent conductive segments 144 within a cell 100A are to be formed in a same vertical track VT, a ratio of the distance Pv to the distance Pm is greater than or equal to a predetermined value, such as a first predetermined distance ratio limit X1. In other words, Pv/Pm≥X1. The first predetermined distance ratio limit may be defined according to different requirements of different generations of semiconductor devices. In some embodiments, the first predetermined distance ratio limit is greater than or equal to about 5.5. In some embodiments, the first predetermined distance ratio limit is greater than or equal to about 5.8. In some embodiments, the first predetermined distance ratio limit is greater than or equal to about 7. In some embodiments, the first predetermined distance ratio limit is greater than or equal to about 7.5.

In some embodiments, according to a design rule for the adjacent conductive segments 144 during a DRC operation, if two adjacent conductive segments 144 within a cell 100A are to be formed in a same vertical track VT, a value of the width Pw divided by the distance Pv is less than or equal to a predetermined value, such as a second predetermined distance ratio limit X2. In other words, Pw/Pv≤X2. The second predetermined distance ratio limit may be defined according to different requirements of different generations of semiconductor devices. In some embodiments, the second predetermined distance ratio limit is less than or equal to about 0.24. In some embodiments, the second predetermined distance ratio limit is less than or equal to about 0.22. In some embodiments, the second predetermined distance ratio limit is less than or equal to about 0.16. In some embodiments, the second predetermined distance ratio limit is less than or equal to about 0.14.

Figure 2B:
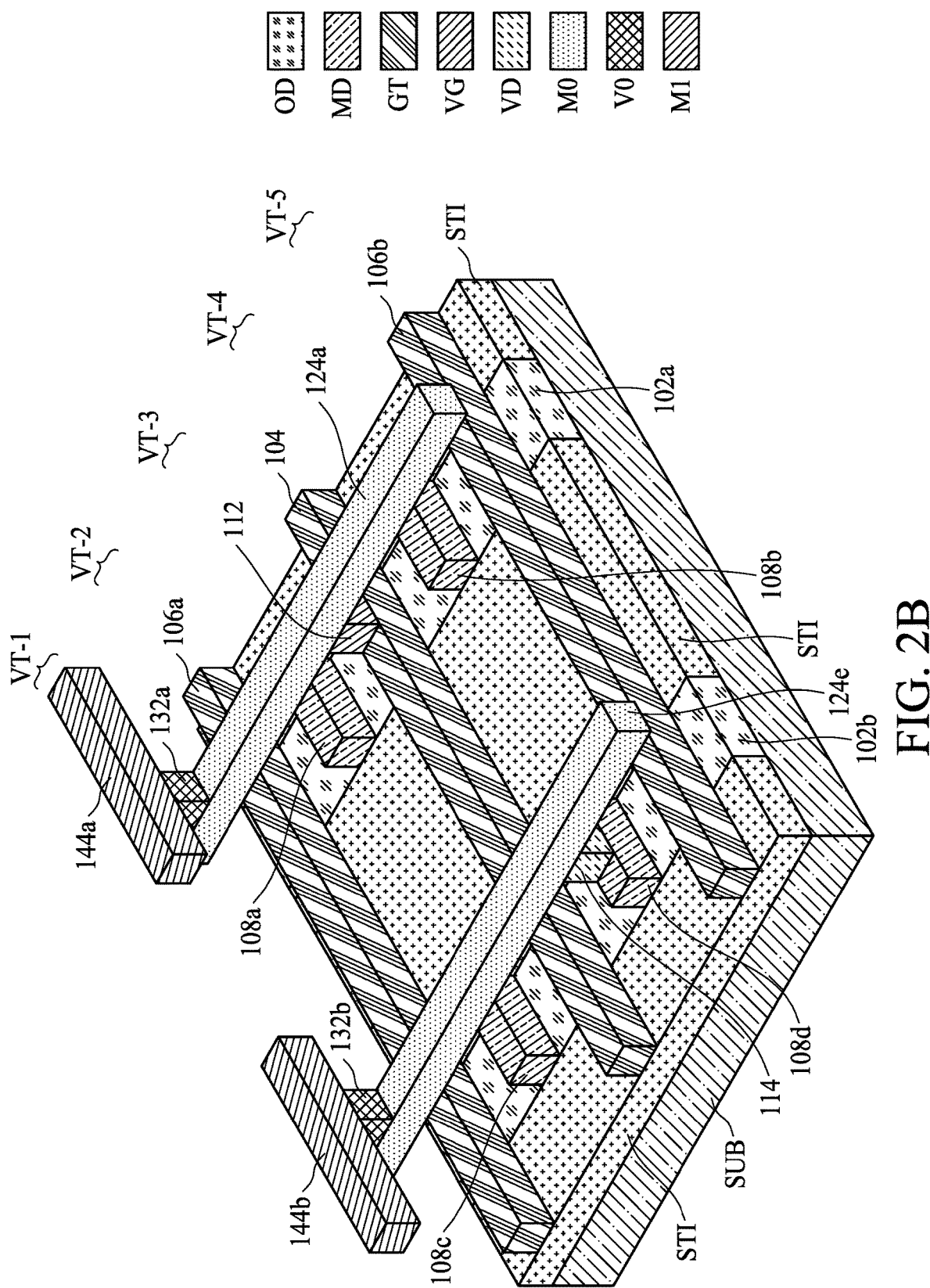
FIG. 2B is a perspective view of a semiconductor device, in accordance with some embodiments of the present disclosure.

FIG. 2B is a perspective view of a semiconductor device, in accordance with some embodiments of the present disclosure. The perspective view is similar to the design layout 100B in many aspects, and therefore the similar descriptions are omitted for brevity. The perspective view merely illustrates the components forming the conductive segments 144a and 144b according to the design rules for the adjacent conductive segments 144 as discussed above. For example, the conductive segments 144a and 144b arranged in the conductive line layer L5 are provided in the vertical track VT-1. The conductive segment 144a is aligned with the conductive segment 144b. The conductive segments 124a and 124e may serve as an input pin and an output pin of the cell 100A, respectively. The conductive via 132a arranged in the conductive via layer L4 which is directly over the conductive segment 124a electrically connects the conductive segment 124a to the conductive segment 144a. The conductive via 132b arranged in the conductive via layer L4 which is directly over the conductive segment 124e electrically connects the conductive segment 124e to the conductive segment 144b.

The layout embodiments illustrated above shows the cells with only five horizontal tracks HT between the power rails 122a and 122b and only five vertical tracks VT. However, these embodiments are provided for illustrative purposes. In some other embodiments, the standard cells having more or less than five horizontal tracks HT and more or less than five vertical tracks VT are also within the contemplated scope of the present disclosure.

Figure 3:
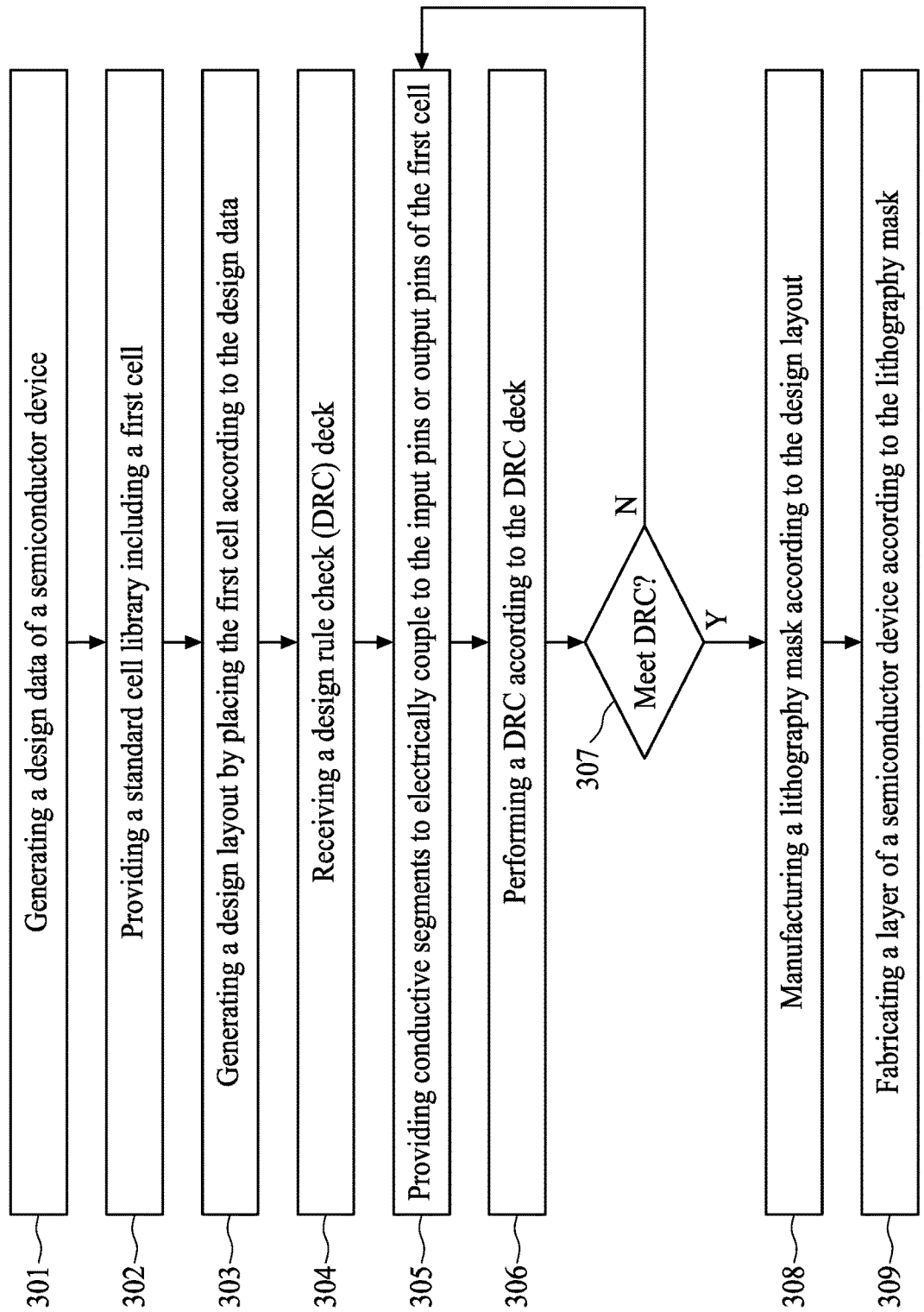
FIG. 3 is a flowchart of a layout method, in accordance with some embodiments of the present disclosure.

FIG. 3 is a flowchart of a layout method 300, in accordance with some embodiments. The design layout 300 may be related to, part of, or a group of a semiconductor device, e.g., a MOS device, and can be implemented using a planar FET device, a FinFET device, a GAA device, a GAAFET device, a nanowire device, a FDSOI device, or the like.

At step 301, a design data of a semiconductor device is generated or received. The design data may be represented as a netlist, a schematic diagram, a circuit diagram or the like. In some embodiments, the semiconductor device includes at least one electronic circuit, which can be a logic gate device in various types, such as a NAND gate, an inverter gate, an XOR gate, an AND gate, a NOR gate, an AOI gate, or other suitable logic gate devices. In some embodiments, the design data in step 302 is generated during a synthesis stage of a design flow for manufacturing the semiconductor device.

At step 302, a standard cell library is provided which includes a first cell. In some embodiments, the first cell may be the cell 100A as discussed above. The descriptions of the cell 100A are discussed previously and are not repeated for brevity.

At step 303, a design layout is generated by placing the first cell according to the design data. The step 303 may be performed during a placement and routing stage of a design flow for manufacturing a semiconductor device.

At step 304, receiving a design rule check (DRC) deck. The DRC deck may be provided by a cell library designer or a semiconductor manufacturing party. The DRC deck may be included in a database along with the cell library and stored in a non-transitory computer-readable medium. The DRC deck includes a set of design rules for the placing and routing of the first cell and may be accessed in a placement and routing operation during the cell design procedure. The step 304 may be performed prior to step 301, 302 or 303.

In some embodiments, the design rule of the DRC deck includes a first distance, a second distance and a length, wherein the first distance is the distance Pv as previously discussed, the second distance is a minimum spacing between the conductive segments (also referred to as a minimal segment end spacing), and the length is a minimum via enclosure length of the conductive segments, such as the length Pe as previously discussed. In some embodiments, the DRC deck includes a first distance and a third distance, wherein the first distance is the distance Pv and the third distance is a spacing between the first conductive segment and the first power rail, such as the distance Pm as previously discussed. In some embodiments, the DRC deck includes a first distance and a first width, wherein the first distance is the distance Pv and the first width is the width Pw as previously discussed. In some embodiments, the DRC deck includes a minimal via spacing, which is a minimum spacing between adjacent conductive vias.

At step 305, conductive segments are provided to electrically couple to the input pins or output pins of the first cell. In some embodiments, conductive segments (such as the conductive segments 144) are allocated to electrically couple to the input pins or output pins (such as the conductive segments 124) of the cell 100A.

At step 306, a DRC is performed according to the DRC deck. At step 307, it is examined whether the allocation of the conductive segments meets the requirements set forth in the DRC deck. If the examination result of the layout is unfavorable, the flow of the layout method 300 loops back to previous stages for tuning the location of the conductive segments. For example, if two of the conductive segments are allocated in a same vertical track and the distance between the conductive segments in the column direction is less than the minimal segment end spacing, the result of the layout simulation would be unfavorable. Thus, the flow of the layout method 300 should loop back to the previous stage (such as the step 305) for rearranging the conductive segments. If the result of the layout simulation is favorable, the flow of the layout method 300 proceeds to the next step.

In some embodiments, the layout method 300 further includes increasing an average spacing between the conductive segments in a design layout. In some embodiments, every spacing between two adjacent conductive segments in the column direction or in the row direction is calculated and the average spacing is determined according to the recorded data of the spacing values. In some embodiments, after the result of a first layout simulation is favorable, a first average spacing of the first layout is recorded. Further, the layout method 300 loops back to the previous stage (such as the step 305) for rearranging the conductive segments to increase the first average spacing of the first layout. For example, a second layout having a second average spacing greater than the first average spacing is generated according to the rearrangement of the conductive segments.

In some embodiments, the layout method 300 further includes increasing a minimum spacing between the conductive segments in a design layout. In some embodiments, every spacing between two adjacent conductive segments in the column direction or in the row direction is calculated and the minimum spacing is determined according to recorded data of the spacing values. In some embodiments, after the result of a first layout simulation is favorable, a first minimum spacing of the first layout is recorded. Further, the layout method 300 loops back to the previous stage (such as the step 305) for rearranging the conductive segments to increase the first minimum spacing of the first layout. For example, a second layout having a second minimum spacing greater than the first minimum spacing is generated according to the rearrangement of the conductive segments.

At step 307, a lithography mask is manufactured according to the design layout. At step 308, a semiconductor device fabricated in which a layer of the semiconductor device is formed according to the lithography mask. In some embodiments, the semiconductor device is fabricated according to the favorable design layout.

The layout embodiments illustrated above shows the placement and routing of the conductive segments (M1) 144 according to the conductive segments (M0) 124 configured as input/output pins of the cell 100A. However, the embodiments as set forth are provided for illustrative purposes. In some other embodiments, a cell may have the conductive segments (M1) 144 configured as input/output pins of the cell, and additional conductive segments in a conductive line layer in a higher layer over the conductive line layer L5 may be placed and routed to the underlying conductive segments 144 (M1) in the conductive line layer L5. The rule of arranging these conductive segments in the higher layer may also follow the spacing or distance values contained in the DRC deck as previously discussed.

For example, the rule of arranging these conductive segments in the higher layer may also include a first distance, a second distance, a third distance, a width and a length. The first distance is defined as a spacing between adjacent conductive vias measured in the row direction in a horizontal track HT. The second distance is defined as a spacing between adjacent conductive segments measured in the row direction in a horizontal track HT. The third distance is defined as a spacing between a power rail and the conductive segment disposed immediately adjacent to the power rail, measured in the row direction. The width is defined as a width of each of the conductive segments. The length is defined as a via enclosure length of the conductive segment with respect to the conductive via to which the conductive segment is electrically coupled. The length may be measured, in the row direction, from an end side of the conductive segment to a side of the conductive via closest to the end side of the conductive segment.

Figure 4A:
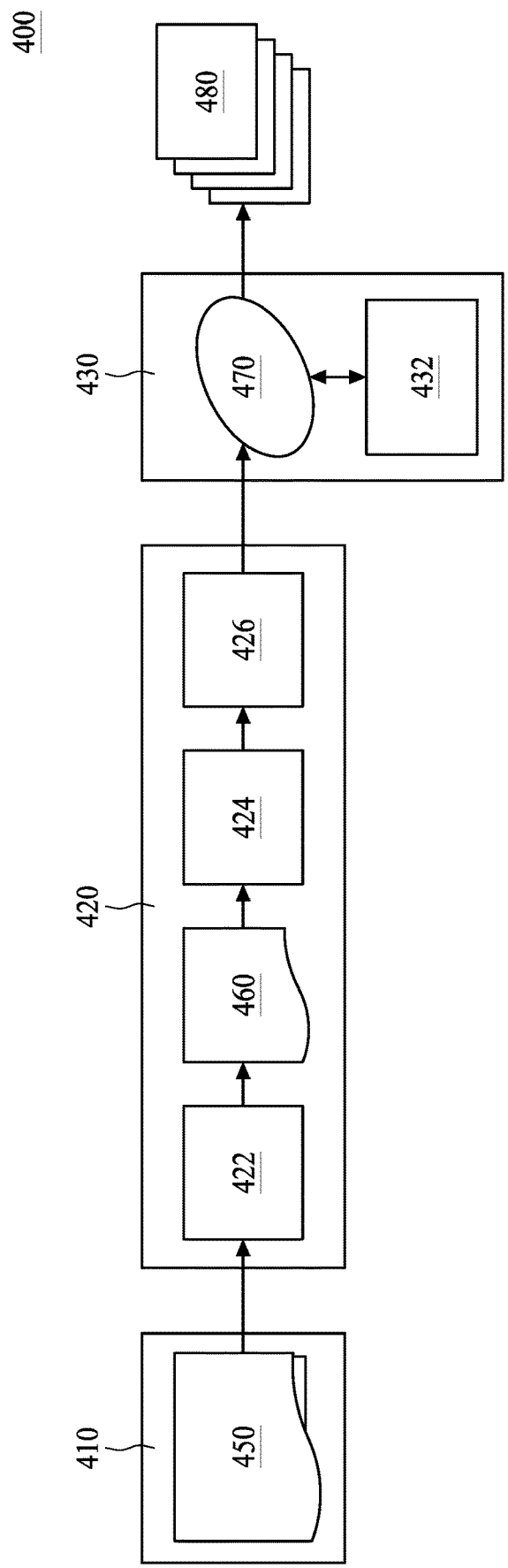
FIG. 4A is a schematic diagram showing an integrated circuit (IC) manufacturing system, in accordance with some embodiments.

FIG. 4A is a schematic diagram 400 showing an integrated circuit (IC) manufacturing system, in accordance with some embodiments. The IC manufacturing system 400 is configured to manufacture an IC device 480 through a plurality of entities, such as a design subsystem 410, a mask subsystem 420, and a fabrication subsystem 430. The entities in the IC manufacturing system 400 may be linked by a communication channel, e.g., a wired or wireless channel, and interact with one another through a network, e.g., an intranet or the internet. In an embodiment, the design subsystem 410, the mask subsystem 420 and the fabrication subsystem 430 belong to a single entity, or are operated by independent parties.

The design subsystem (design house or layout design provider) 410 generates a design layout 450 in a design phase for the IC devices 480 to be fabricated. The design subsystem 410 may perform the layout methods discussed in the present disclosure to generate the design layout 450, e.g., the design layouts shown with reference to the figures of the present disclosure. In an embodiment, the design subsystem 410 operates a circuit design procedure to generate the design layout 450. The design subsystem 410 may include further one or more steps, such as logic design, physical design, pre-layout simulation, placement and routing, timing analysis, parameter extraction, design rule check and post-layout simulation, to generate the design layout 450. The design layout 450 may be converted from description texts into their visual equivalents to show a physical layout of the depicted patterns, such as the dimensions, shapes and locations thereof. In an embodiment, the design layout 450 can be expressed in a suitable file format such as GDSII, DFII, OASIS, or the like.

The mask subsystem 420 receives the design layout 450 from the design subsystem 410 and manufactures one or more masks (photomask, lithography masks or reticles) according to the design layout 450. In an embodiment, the mask subsystem 420 includes a mask data preparation block 422, a mask fabrication block 424 and a mask inspection block 426. The mask data preparation block 422 modifies the design layout 450 so that a revised design layout 460 can allow a mask writer to transfer the design layout 450 to a writer-readable format.

The mask fabrication block 424 is configured to fabricate the mask by preparing a substrate based on the design layout 460 provided by the mask data preparation block 422. A mask substrate is exposed to a radiation beam, such as an electron beam, based on the pattern of the design layout 460 in a writing operation, which may be followed by an etching operation to leave behind the patterns corresponding to the design layout 460. In an embodiment, the mask fabrication block 424 includes a checking procedure to ensure that the layout data 460 complies with requirements of a mask writer and/or a mask manufacturer to generate the mask as desired. An electron-beam (e-beam), multiple e-beams, an ion beam, a laser beam or other suitable writer source may be used to transfer the patterns.

After the lithography mask is fabricated, the mask inspection block 426 inspects the fabricated mask to determine if any defects, such as full-height and non-full-height defects, exist in the fabricated mask. If any defects are detected, the mask may be cleaned or the design layout in the mask may be modified.

The fabrication subsystem 430 is an IC manufacturing entity that includes multiple manufacturing facilities or tools for the fabrication of a variety of the IC devices 480. The fabrication subsystem 430 uses the mask fabricated by the mask subsystem 420 to fabricate a wafer 470 having a plurality of IC devices 480 thereon. The wafer 470 includes a semiconductor substrate and optionally various layers formed thereon. The operations provided by the manufacturing facilities or tools may include, but not limited to, photolithography, deposition, sputtering, etching, diffusion, ion implantation and annealing. In some embodiments, test structures may be formed on the wafer 470 to generate test data indicative of the quality of the fabricated wafer 470. In an embodiment, the fabrication subsystem 430 includes a wafer testing block 432 configured to ensure that the wafer 470 conforms to physical manufacturing specifications and mechanical and/or electrical performance specifications. After the wafer 470 passes the testing procedure performed by the wafer testing block 432, the wafer 470 may be diced (or sliced) along the scribe line regions to form separate IC devices 480. The dicing process can be accomplished by scribing and breaking, by mechanical sawing (e.g., with a dicing saw) or by laser cutting.

Figure 4B:
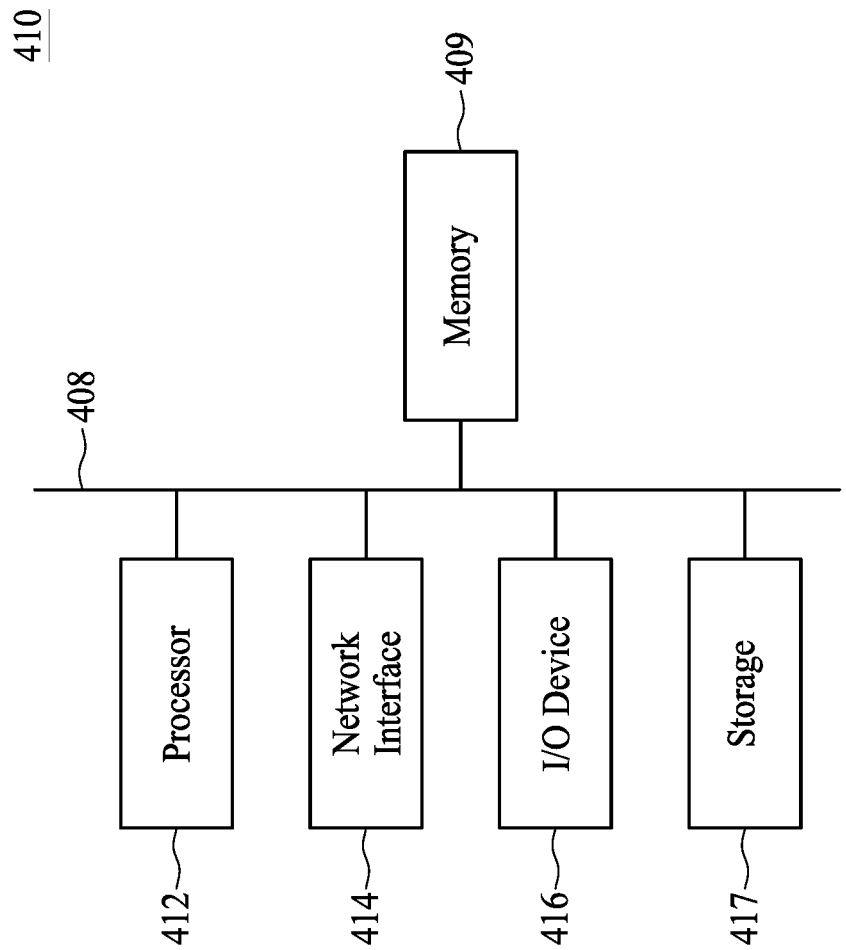
FIG. 4B is a schematic diagram of a design subsystem in the IC manufacturing system shown in FIG. 4A for generating a design layout, in accordance with some embodiments.

FIG. 4B is a schematic diagram of the design subsystem 410 in the IC manufacturing system 400 shown in FIG. 4A for generating or storing the design layouts discussed above, in accordance with some embodiments. In some embodiments, the design subsystem 410 is a computer system. The design subsystem 410 includes a processor 412, a network interface 414, an input and output (I/O) device 416, a storage device 417, a memory 409, and a bus 408. The bus 408 couples the network interface 414, the I/O device 416, the storage device 417, the memory 409 and the processor 412 to each other.

The processor 412 is configured to execute program instructions that include a tool configured to generate the design layouts as described and illustrated with reference to figures of the present disclosure.

The network interface 414 is configured to access program instructions and data accessed by the program instructions stored remotely through a network (not shown).

The I/O device 416 includes an input device and an output device configured for enabling user interaction with the system 410. In some embodiments, the input device includes, for example, a keyboard, a mouse, and other devices. Moreover, the output device includes, for example, a display, a printer, and other devices.

The storage device 417 is configured for storing the design layouts, program instructions and data accessed by the program instructions. In some embodiments, the storage device 417 includes a non-transitory computer-readable storage medium, for example, a magnetic disk and an optical disk.

The memory 409 is configured to store program instructions to be executed by the processor 412 and data accessed by the program instructions. In some embodiments, the memory 409 includes any combination of a random access memory (RAM), some other volatile storage device, a read-only memory (ROM), and some other non-volatile storage device.

According to an embodiment, a layout method, executed by at least one processor, includes: generating a design layout by placing a cell, wherein the cell includes: a source/drain region in a first layer; a gate electrode extending in a first direction in a second layer; a first power rail and a second power rail extending in a second direction perpendicular to the first direction in a third layer over the second layer, wherein the first power rail and the second power rail are on opposite sides of the cell; and a plurality of conductive segments extending in the second direction between the first and second power rails in the third layer. In some embodiments, the plurality of conductive segments includes: a first conductive segment overlapping the source/drain region from a top-view perspective and disposed immediately adjacent to the first power rail, wherein the first conductive segment has a length substantially equal to a cell length, measured in the second direction, of the cell; a second conductive segment; and a third conductive segment between the first and second conductive segments. The layout method further includes: providing a fourth conductive segment and a fifth conductive segment to the design layout, wherein the fourth and fifth conductive segments extend in the first direction in a fourth layer over the third layer and are aligned in the first direction; providing a first conductive via to the design layout, wherein the first conductive via electrically connects the first conductive segment to the fourth conductive segment; and providing a second conductive via to the design layout, wherein the second conductive via electrically connects the second conductive segment to the fifth conductive segment.

According to an embodiment, a layout method, executed by at least one processor, includes: determining a number M of tracks in a first direction for a cell, wherein M is a natural number; and generating a design layout by placing the cell. In some embodiments, the cell includes: a transistor disposed in a transistor layer having a gate electrode extending in the first direction; a first power rail and a second power rail extending in a second direction perpendicular to the first direction in a first layer over the transistor layer, wherein the first power rail and the second power rail are on opposite sides of the cell; and a plurality of first conductive segments extending in the second direction between the first and second power rails in the first layer, wherein the first conductive segments are configured as input/output pins of the cell. The layout method further includes: receiving a design rule check (DRC) deck, the DRC deck containing a minimal segment end spacing; providing a number N of second conductive segments extending in the first direction in a second layer over the first layer, wherein each of the N second conductive segments is aligned with one of the M tracks and electrically connected to the corresponding first conductive segments, wherein N is a natural number greater than or equal to M, wherein at least two of the N second conductive segments are aligned to one of the M tracks in the first direction and separated by a spacing substantially equal to or greater than the minimal segment end spacing.

According to an embodiment, a semiconductor device includes a cell, wherein the cell includes: a transistor disposed in a transistor layer and having a gate electrode extending in a first direction; a first power rail and a second power rail extending in a second direction perpendicular to the first direction in a first layer over the transistor layer, wherein the first power rail and the second power rail are on opposite sides of the cell; and a number M of first conductive segments extending in the second direction in the first layer between the first and second power rails, wherein M is a natural number and the M first conductive segments are configured as input/output pins of the cell. The semiconductor device further includes: a third power rail extending in the first direction in a second layer over the first layer; and M second conductive segments extending in the first direction in the second layer adjacent to the third power rail and allocated in K tracks of the cell, wherein K is a natural number less than or equal to M. In some embodiments, at least two of the M second conductive segments are aligned in the first direction in one of the K tracks and electrically coupled to respective two of the M first conductive segments through a first conductive via and a second conductive via, wherein the first conductive via and the second conductive via are separated by a first distance, each of the respective two of the M first conductive segments has a via enclosure length, and the respective two of the M first conductive segments are separated by a second distance, wherein the first distance is greater than a sum of the second distance and two times the via enclosure length.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A layout method, executed by at least one processor, comprising:
   determining a number M of tracks in a first direction for a cell, wherein M is a natural number;
   generating a design layout by placing the cell, wherein the cell comprises:
      a transistor disposed in a transistor layer having a gate electrode extending in the first direction;
      a first power rail and a second power rail extending in a second direction perpendicular to the first direction in a first layer over the transistor layer, wherein the first power rail and the second power rail are disposed on opposite sides of the cell; and
      a plurality of first conductive segments extending in the second direction between the first and second power rails in the first layer, wherein the first conductive segments are configured as input/output pins of the cell;
   receiving a design rule check (DRC) deck, the DRC deck containing a minimal segment end spacing;
   providing a third power rail extending in the first direction in a second layer over the first layer, the third power rail occupying one of the M tracks in the cell; and
   in response to the occupied one of the M tracks, providing M second conductive segments extending in the first direction in the second layer, wherein each of the M second conductive segments is aligned with one of remaining M-1 tracks and configured to be electrically connected to one of the first conductive segments,
   wherein at least two of the M second conductive segments are all aligned with a single track of the remaining M-1 tracks in the first direction and are separated by a spacing substantially equal to or greater than the minimal segment end spacing.

2. The layout method according to claim 1, wherein the third power rail extends throughout a height of the cell in the first direction in the second layer.

3. The layout method according to claim 1, further comprising:
   providing M-1 conductive vias electrically connecting the M-1 second conductive segments to the one of the first conductive segments,
   wherein any two of the M-1 conductive vias are separated by a spacing substantially equal to or greater than a minimal via spacing contained in the DRC deck.

4. The layout method according to claim 3, wherein at least two of the M-1 conductive vias are aligned in the first direction in one of the M tracks.

5. The layout method according to claim 4, wherein, according to the DRC deck, a first distance between the at least two of the conductive vias is greater than a second distance between any other two of the conductive vias.

6. The layout method according to claim 1, wherein the transistor further comprises a source/drain region, and at least one of the first conductive segments overlaps the source/drain region from a top-view perspective and is disposed immediately adjacent to the first power rail.

7. The layout method according to claim 1, wherein one of the first conductive segments has a length greater than that of any other first conductive segment and is disposed immediately adjacent to the first power rail.

8. A layout method, executed by at least one processor, the layout method comprising:
   generating a design layout by placing a cell, wherein the cell comprises:
      a first source/drain region and a second source/drain region in a first layer;
      a gate electrode extending in a first direction in a second layer, wherein the cell further includes a plurality of tracks extending in the first direction;
      a first power rail and a second power rail extending in a second direction perpendicular to the first direction in a third layer over the second layer, wherein the first power rail and the second power rail are on opposite sides of the cell; and
      a plurality of conductive segments extending in the second direction between the first and second power rails in the third layer, wherein the plurality of conductive segments comprises:
         a first conductive segment overlapping the first source/drain region from a top-view perspective and disposed immediately adjacent to the first power rail;
         a second conductive segment overlapping the second source/drain region from a top-view perspective and disposed immediately adjacent to the second power rail;
         a third conductive segment disposed between the first conductive segment and the second conductive segment; and
      a third power rail extending in the first direction in a fourth layer over the third layer, the third power rail occupying one of the plurality of tracks in the cell; and
   in response to the occupied one of the plurality of tracks, providing a fourth conductive segment and a fifth conductive segment to the design layout, wherein the fourth and fifth conductive segments extend in the first direction in the fourth layer and are both aligned with a single one of the plurality of tracks,
   wherein a number of the plurality of conductive segments is equal to or greater than a number of the plurality of tracks.

9. The layout method according to claim 8, further comprising:
   providing a first conductive via to the design layout, wherein the first conductive via electrically connects the first conductive segment to the fourth conductive segment; and providing a second conductive via to the design layout, wherein the second conductive via electrically connects the second conductive segment to the fifth conductive segment.

10. The layout method according to claim 9, further comprising:
receiving a design rule check (DRC) deck, the DRC deck including a first distance, a second distance and a first length, wherein the first distance is a spacing between the first conductive via and the second conductive via, the second distance is a minimum spacing between the fourth conductive segment and the fifth conductive segment, and the first length is a minimum via enclosure length of the fourth conductive segment and the fifth conductive segment,
wherein the providing of the first conductive via and the providing of the second conductive via fulfills a requirement of the DRC that the first distance is greater than a sum of the second distance and twice the first length.

11. The layout method according to claim 9, further comprising:
receiving a DRC deck, the DRC deck including a first distance and a second distance,
wherein the first distance is a spacing between the first conductive via and the second conductive via and the second distance is a spacing between the first conductive segment and the first power rail,
wherein the providing of the first conductive via and the providing of the second conductive via fulfills a requirement of the DRC that a ratio of the first distance to the second distance is greater than 5.5.

12. The layout method according to claim 9, further comprising:
receiving a DRC deck, the DRC deck further including a first distance and a first width, wherein the first distance is a spacing between the first conductive via and the second conductive via and the first width is a width of each of the plurality of conductive segments measured in the first direction,
wherein the providing of the first conductive via and the providing of the second conductive via fulfills a requirement of the DRC that a value of the first width divided by the first distance is less than 0.24.

13. The layout method according to claim 8, wherein the cell further comprises a third conductive via overlapping the first source/drain region from a top-view perspective and electrically connecting the first conductive segment to the gate electrode.

14. The layout method according to claim 8, wherein a length of the first conductive segment is greater than or equal to a length of the third conductive segment.

15. The layout method according to claim 14, wherein the first conductive segment has a length substantially equal to a cell length, measured in the second direction, of the cell.

16. The layout method according to claim 8, wherein a length of the second conductive segment is substantially equal to or less than a length of the first conductive segment.

17. The layout method according to claim 8, further comprising:
providing a sixth conductive segment to the design layout prior to the providing of the fourth conductive segment and the fifth conductive segment, wherein the sixth conductive segment extends in the first direction in the fourth layer.

18. A layout method, executed by at least one processor, comprising:
determining a number M of tracks extending in a first direction for a cell, wherein M is a natural number;
receiving a design rule check (DRC) deck, the DRC deck including a minimal via spacing;
generating a design layout by placing the cell, wherein the cell comprises:
a transistor disposed in a transistor layer having a first source/drain region and a second source/drain region extending in a second direction, and a gate electrode extending in the first direction between the first source/drain region and the second source/drain region;
a first power rail and a second power rail extending in the second direction in a first layer over the transistor layer, wherein the first power rail and the second power rail are disposed on opposite sides of the cell; and
a plurality of first conductive segments extending in the second direction between the first and second power rails in the first layer;
providing a third power rail extending in the first direction in a second layer over the first layer, the third power rail occupying one of the M tracks in the cell;
in response to the occupied one of the M tracks, providing a number N of second conductive segments extending in the first direction in the second layer, N being a natural number greater than or equal to M, wherein each of the N second conductive segments corresponds to one of the M tracks and electrically connected to one of the first conductive segments, wherein two of the N second conductive segments are aligned to each other in the first direction and are both aligned with a single track of the M tracks; and
providing N conductive vias to electrically couple first conductive segments to the corresponding second conductive segments, wherein any two of the N conductive vias are separated by a spacing substantially at least equal to the minimal via spacing.

19. The layout method according to claim 18, wherein a third segment of the first conductive segments has a length substantially equal to a cell length measured in the second direction.

20. The layout method according to claim 18, wherein the two of the N conductive vias overlap an uppermost one and a lowest one, respectively, of the first conductive segments.

* * * * *